US012394322B2

(12) United States Patent
Naqvi

(10) Patent No.: US 12,394,322 B2
(45) Date of Patent: Aug. 19, 2025

(54) EQUITABLE RESOURCE ACCESS THROUGH ADJUDICATION OF FLIGHT PLAN REQUESTS OR OTHER REQUESTS

(71) Applicant: Raytheon Company, Waltham, MA (US)

(72) Inventor: Waseem Naqvi, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 192 days.

(21) Appl. No.: 18/313,880

(22) Filed: May 8, 2023

(65) Prior Publication Data

US 2024/0379012 A1 Nov. 14, 2024

(51) Int. Cl.
*G08G 5/20* (2025.01)
*G08G 5/30* (2025.01)

(52) U.S. Cl.
CPC ................. *G08G 5/30* (2025.01); *G08G 5/20* (2025.01)

(58) Field of Classification Search
None
See application file for complete search history.

(56) References Cited

U.S. PATENT DOCUMENTS

2008/0004792 A1* 1/2008 Wise ........................ G08G 5/56 342/36
2010/0114406 A1* 5/2010 DeJonge .............. G08G 5/0043 701/1
2018/0253978 A1* 9/2018 Tabuchi ............... G08G 5/0069
2022/0063689 A1* 3/2022 Kumar ................... H04N 23/65
2023/0035944 A1* 2/2023 Huang ................. G08G 5/0052
2023/0368681 A1* 11/2023 Altus ................... G08G 5/0026

OTHER PUBLICATIONS

Chin et al., "Efficiency and Fairness in Unmanned Air Traffic Flow Management," IEEE Transactions on Intelligent Transportation Systems, Jan. 2021, 12 pages.
Sachs et al., "Evaluating Fairness in UTM Architecture and Operations," Airbus UTM, Version 1.1, Feb. 2020, 26 pages.
Airbus, "Understanding Fairness in Unmanned Traffic Management," https://www.airbusutm.com/airspace-fairness, 2020, 3 pages.
Grote et al., "Sharing Airspace with Uncrewed Aerial Vehicles (UAVs): Views of the General Aviation (GA) Community," Journal of Air Transport Management, Jul. 2022, 15 pages.

(Continued)

*Primary Examiner* — James M McPherson

(57) ABSTRACT

A method includes obtaining information associated with requests to access at least one shared resource. The requests are associated with multiple requestors wishing to access or use the at least one shared resource. The method also includes generating at least one expected distribution of requests. The at least one expected distribution of requests defines one or more expected or desired characteristics of the requests. The method further includes granting one or more first ones of the requests in response to determining that the one or more first ones of the requests have the one or more expected or desired characteristics. In addition, the method includes denying or demoting one or more second ones of the requests in response to determining that the one or more second ones of the requests do not have the one or more expected or desired characteristics.

20 Claims, 6 Drawing Sheets

(56) References Cited

OTHER PUBLICATIONS

Kim, "Collaborative Resource Allocation Strategies for Air Traffic Flow Management," Dissertation submitted in partial satisfaction of the requirements for the degree of Doctor of Philosophy in Engineering—Civil and Environmental Engineering at University of California, Berkeley, 2011, 105 pages (see esp. pp. 64-65).

* cited by examiner

400

402

| RESOURCE ID | SEQ NUM | REQUEST ID (CALL SIGN) | REQUEST OPERATOR | EQUITABLE STATUS | ACTION | REQUESTED TIME | REQUESTED DURATION | ESTIMATED TIME |
|---|---|---|---|---|---|---|---|---|
| VPAD1 | 1 | JBY11 | JBY | 1 S | APPROVE (=) | 12:03 | 5 mins | 12:04 |
| VPAD1 | 2 | JBY13 | JBY | 2 S | DEMOTE (V) | 12:05 | 5 mins | 12:06 |
| VPAD1 | 3 | EVE02 | EVE | 1 S | APPROVE (=) | 12:08 | 5 mins | 12:09 |
| VPAD1 | 4 | EVE03 | EVE | 1 S | APPROVE (=) | 12:18 | 5 mins | 12:20 |
| VPAD1 | 5 | EVE04 | EVE | 3 S | DENY (!) | 12:19 | 5 mins | 12:21 |
| VPAD1 | 6 | JBY14 | JBY | 1 S | APPROVE (=) | 12:24 | 5 mins | 12:26 |

404

FIG. 4

EQUITABLE RESOURCE ACCESS THROUGH ADJUDICATION OF FLIGHT PLAN REQUESTS OR OTHER REQUESTS

TECHNICAL FIELD

This disclosure is generally directed to resource management systems. More specifically, this disclosure is directed to equitable resource access through adjudication of flight plan requests or other requests.

BACKGROUND

Various types of aircraft can operate within the same general airspace, such as when airplanes, helicopters, air taxis, and drones or other unmanned aircraft systems (UASs) can operate over a city or in some other common airspace. In order to avoid collisions or other safety concerns, operators of certain aircraft often need to file flight intents and obtain approval of the flight intents prior to flying into a given airspace. For example, airline operators generally need to file flight plans and receive approval before traveling along the paths identified in those flight plans. This is typically done using a manual process where air traffic controllers and airline operators adjudicate and barter for access to a given airspace. Also, UAS traffic management (UTM) systems are being developed to integrate drones and other UASs into air traffic that is already present in low-altitude airspaces.

SUMMARY

This disclosure relates to equitable resource access through adjudication of flight plan requests or other requests.

In a first embodiment, a method includes obtaining information associated with requests to access at least one shared resource, where the requests are associated with multiple requestors wishing to access or use the at least one shared resource. The method also includes generating at least one expected distribution of requests, where the at least one expected distribution of requests defines one or more expected or desired characteristics of the requests to access or use the at least one shared resource. The method further includes granting one or more first ones of the requests to access or use the at least one shared resource in response to determining that the one or more first ones of the requests have the one or more expected or desired characteristics. In addition, the method includes denying or demoting one or more second ones of the requests to access or use the at least one shared resource in response to determining that the one or more second ones of the requests do not have the one or more expected or desired characteristics.

In a second embodiment, an apparatus includes at least one processing device configured to obtain information associated with requests to access at least one shared resource, where the requests are associated with multiple requestors wishing to access or use the at least one shared resource. The at least one processing device is also configured to generate at least one expected distribution of requests, where the at least one expected distribution of requests defines one or more expected or desired characteristics of the requests to access or use the at least one shared resource. The at least one processing device is further configured to grant one or more first ones of the requests to access or use the at least one shared resource in response to determining that the one or more first ones of the requests have the one or more expected or desired characteristics. In addition, the at least one processing device is configured to deny or demote one or more second ones of the requests to access or use the at least one shared resource in response to determining that the one or more second ones of the requests do not have the one or more expected or desired characteristics.

In a third embodiment, a non-transitory computer readable medium stores instructions that when executed cause at least one processor to obtain information associated with requests to access at least one shared resource, where the requests are associated with multiple requestors wishing to access or use the at least one shared resource. The non-transitory computer readable medium also stores instructions that when executed cause the at least one processor to generate at least one expected distribution of requests, where the at least one expected distribution of requests defines one or more expected or desired characteristics of the requests to access or use the at least one shared resource. The non-transitory computer readable medium further stores instructions that when executed cause the at least one processor to grant one or more first ones of the requests to access or use the at least one shared resource in response to determining that the one or more first ones of the requests have the one or more expected or desired characteristics. In addition, the non-transitory computer readable medium stores instructions that when executed cause the at least one processor to deny or demote one or more second ones of the requests to access or use the at least one shared resource in response to determining that the one or more second ones of the requests do not have the one or more expected or desired characteristics.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 4 illustrates an example graphical user interface identifying results of equitable resource access through adjudication of flight plan requests or other requests according to this disclosure;

DETAILED DESCRIPTION

Figure 1:
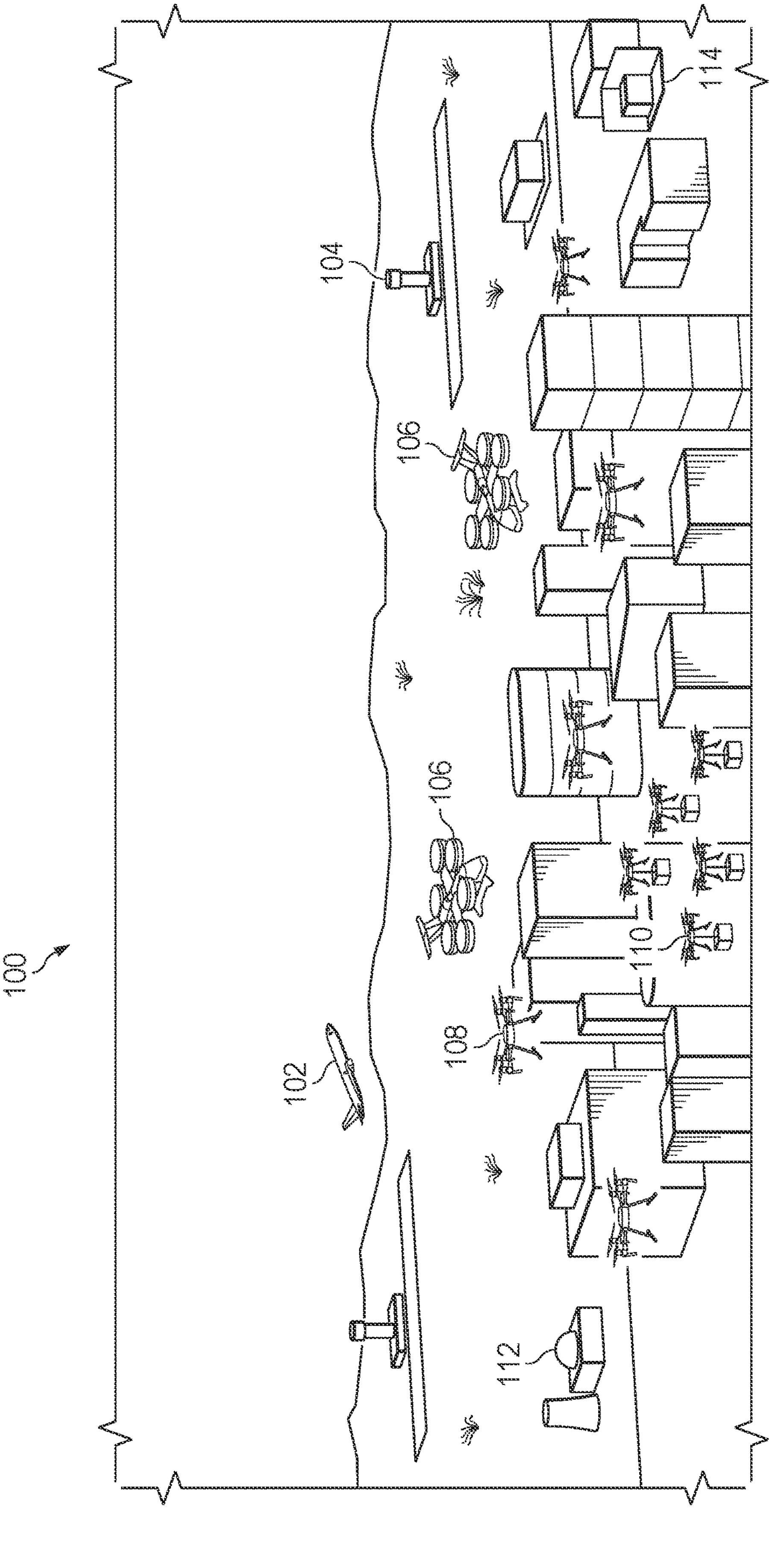
FIG. 1 illustrates an example airspace in which equitable resource access through adjudication of flight plan requests or other requests can be supported according to this disclosure.

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various types of aircraft can operate within the same general airspace, such as when airplanes, helicopters, air taxis, and drones or other unmanned aircraft systems (UASs) can operate over a city or in some other common airspace. In order to avoid collisions or other safety concerns, operators of certain aircraft often need to file flight intents and obtain approval of the flight intents prior to flying into a given airspace. For example, airline operators generally need to file flight plans and receive approval before traveling along the paths identified in those flight plans. This is typically done using a manual process where air traffic controllers and airline operators adjudicate and barter for access to a given airspace. Also, UAS traffic management (UTM) systems are being developed to integrate drones and other UASs into air traffic that is already present in low-altitude airspaces.

Unfortunately, systems for reserving airspace resources for aircraft often use a first-come, first-served approach in which the first airspace operator to file a flight intent is granted access to the airspace. A flight intent may represent a request for permission to follow a specified flight plan in a given airspace during a given time period. Ideally, this approach allows each airspace operator to reserve adequate airspace resources based on the intended flight operations by those airspace operators. However, in reality, "greedy" airspace operators can use this type of system to monopolize an airspace by filing multiple flight intents in advance so that their aircraft can operate in the airspace while preventing competitors from operating in the airspace. As a particular example, multiple companies are deploying drone package delivery fleets with numerous drones that will be delivering packages from those companies. One of those competitors could attempt to reserve excessive amounts of airspace resources in an attempt to thwart its competitors. As a general rule, each individual airspace operator is typically not interested in "fairness" and is more interested in protecting its own business. This problem will likely become worse over time as various jurisdictions adopt the use of autonomous airspace management systems in which flight intents will be submitted, processed, and approved/rejected in an automated manner. In these types of autonomous systems, humans may not be "in the loop" and therefore may not provide oversight and equitable access.

This disclosure provides various techniques supporting equitable resource access through adjudication of flight plan requests or other requests. As described in more detail below, a system can obtain data from various sources regarding airspace usage and flight intents associated with airspace operators. For example, the system may identify volumes of flights and flight plans or trajectories of the flights within a given airspace over time. The system analyzes the information in order to identify expected distributions of flight intents from various airspace operators. Using the expected distributions, the system can flag flight intents from airspace operators that are outside of an expected distribution. For instance, the system may evaluate the number of flight intents by each airspace operator, such as by counting and categorizing the flight intents over a time period. The flight intents can be evaluated in order to identify any intervals of time in which the flight intents are outside of at least one expected or desired range. When this condition is detected, the associated airspace operator may be flagged as being a "greedy" operator, which means that the airspace operator appears to be requesting excessive airspace resources. Current or subsequent flight intents from that airspace operator may then be managed by rejecting or demoting the priority of those flight intents, which can help to facilitate compliance with a flight volume policy or other specified policy.

In this way, the techniques described in this disclosure enable more equitable access to airspace resources. This is accomplished by identifying parties who submit excessive resource requests and handling those requests appropriately in order to reduce or prevent excessive usage of the airspace resources by the identified parties. This technique can be easily expanded as new autonomous aircraft or other aircraft enter into use within a given airspace, such as small drone logistics companies and companies engaging in "last mile" or "middle mile" deliveries. Moreover, these techniques can be easily incorporated into autonomous airspace management systems in order to automatically manage airspace access. In addition, this approach can still enable those airspace operators identified as "greedy" to operate, such as by proposing at least one alternate date or time for a requested flight. As a result, airspace operators who submit numerous flight intents can still be allowed to operate effectively, just not excessively within given time periods.

Note that while the techniques described in this disclosure are often described in the context of analyzing flight intents by airspace operators in order to provide equitable access to airspace resources, the same or similar approaches may be used for other types of resources. For example, the techniques described in this disclosure may be applied to controlling access to any scarce or limited resources by parties requesting access to those resources, such as when multiple parties may request access to space-based satellite constellations or other space-based systems.

FIG. 1 illustrates an example airspace 100 in which equitable resource access through adjudication of flight plan requests or other requests can be supported according to this disclosure. As shown in FIG. 1, the airspace 100 generally includes or is associated with airspace resources above, near, or within an urban environment or other environment. The airspace 100 is also associated with airspace resources that are used by one or more types of aircraft. For example, portions of the airspace 100 can be used by various airplanes 102, which in this particular example may take off and land at one or more airports 104. Portions of the airspace 100 can also be used by air taxis 106, which represent aircraft used to transport individuals or small groups of people to different locations within the urban environment or other environment. Portions of the airspace 100 can further be used by various unmanned aircraft systems, which in this particular example include larger drones 108 and one or more fleets of smaller package-delivery drones 110. Note that these types of aircraft are used as examples only and that any other or additional types(s) of aircraft may operate within the airspace 100.

There may also be certain locations within the airspace 100 that are restricted in terms of the type(s) of aircraft that may be used. For example, passenger aircraft and other airplanes are often restricted from flying too close to buildings or other structures in urban environments or other environments. As another example, drones and other unmanned aircraft systems are often restricted from flying over, close to, or around airports 104 since this can represent a safety hazard to passenger aircraft and other airplanes. As yet another example, all aircraft may be restricted from flying within the airspace around some types of ground-based facilities, such as a nuclear power generation facility 112 or other sensitive ground-based facility.

While the airspace 100 shown in FIG. 1 has been simplified for ease of illustration and explanation, it is easy to envision how the airspace 100 may quickly become crowded. For example, numerous passenger aircraft and other airplanes may take off and land at the airports 104 throughout the day. Also, a large number of air taxis 106 may operate within the airspace 100 throughout the day, and the flight paths of the air taxis 106 can vary widely depending on the starting and ending destinations of the people who are traveling. In addition, a very large number of drones 108, 110 and other unmanned aircraft systems may operate within the airspace 100 and may travel along flight paths determined by operators of the unmanned aircraft systems, and those flight paths can vary widely depending on the needs of the UAS operators.

Using a conventional first-come, first-served approach here can suffer from a number of shortcomings. For example, a greedy airspace operator could submit numerous flight intents for airspace resources (possibly including flight intents for which the airspace operator has no intention of using), which can crowd out other aircraft from operating within the airspace 100. To help compensate for these or other issues, an equitable resource allocation system 114 may be provided to support equitable resource access. As described in more detail below, the equitable resource allocation system 114 may (among other things) engage in adjudication of flight plan requests or other requests. For example, the equitable resource allocation system 114 can analyze flight intents from airspace operators and other information in order to identify expected distributions of the flight intents, and the equitable resource allocation system 114 can use the expected distributions to identify flight intents that are outside the expected distributions. When flight intents that are outside the expected distributions are identified, the associated airspace operators may be flagged as being greedy operators, and current or subsequent flight intents from those airspace operators may be rejected or demoted (at least for one or more certain periods of time). In some cases, the flight intents from the greedy operators may simply be rejected. In other cases, the flight intents from the greedy operators may be demoted, such as to alternative date or time slots. Decisions by the equitable resource allocation system 114 (such as approved and rejected/demoted flight intents) can be output from the equitable resource allocation system 114 for display to one or more users or can be output for use by any other suitable system (such as an autonomous airspace management system).

Note that while the equitable resource allocation system 114 is shown here as being positioned within an environment associated with the airspace 100, this is not necessarily required. The equitable resource allocation system 114 may be positioned at any suitable location(s) in which the equitable resource allocation system 114 can obtain specified information for processing, and the equitable resource allocation system 114 can provide its outputs to any suitable destination(s). For example, in some embodiments, the equitable resource allocation system 114 may be implemented using at least one remote server or in a cloud-based computing environment, in which case the processing operations performed by the equitable resource allocation system 114 may be located remote (and possibly very remote) from the actual airspace 100 being controlled. Also, in some embodiments, flight intents may be submitted to the equitable resource allocation system 114 by various users (such as air traffic control personnel and air taxi/UAS operators) or by one or more automated systems and flight intent decisions may be received from the equitable resource allocation system 114 via one or more graphical user interfaces, application programming interfaces (APIs), or other mechanisms. In general, this disclosure is not limited to any specific physical implementation of the equitable resource allocation system 114 or any specific input/output mechanisms for interacting with the equitable resource allocation system 114.

Although FIG. 1 illustrates one example of an airspace 100 in which equitable resource access through adjudication of flight plan requests or other requests can be supported, various changes may be made to FIG. 1. For example, the airspace 100 may be associated with any suitable environment and with any suitable type(s) and number(s) of aircraft, and the specific examples of the airspace 100 and the aircraft shown in FIG. 1 are for illustration and explanation only. Also, equitable resource access may be provided for any other suitable resources based on any suitable access requests, and this disclosure is not limited to controlling access to airspace resources through adjudication of flight plan requests having the form of flight intents.

Figure 2:
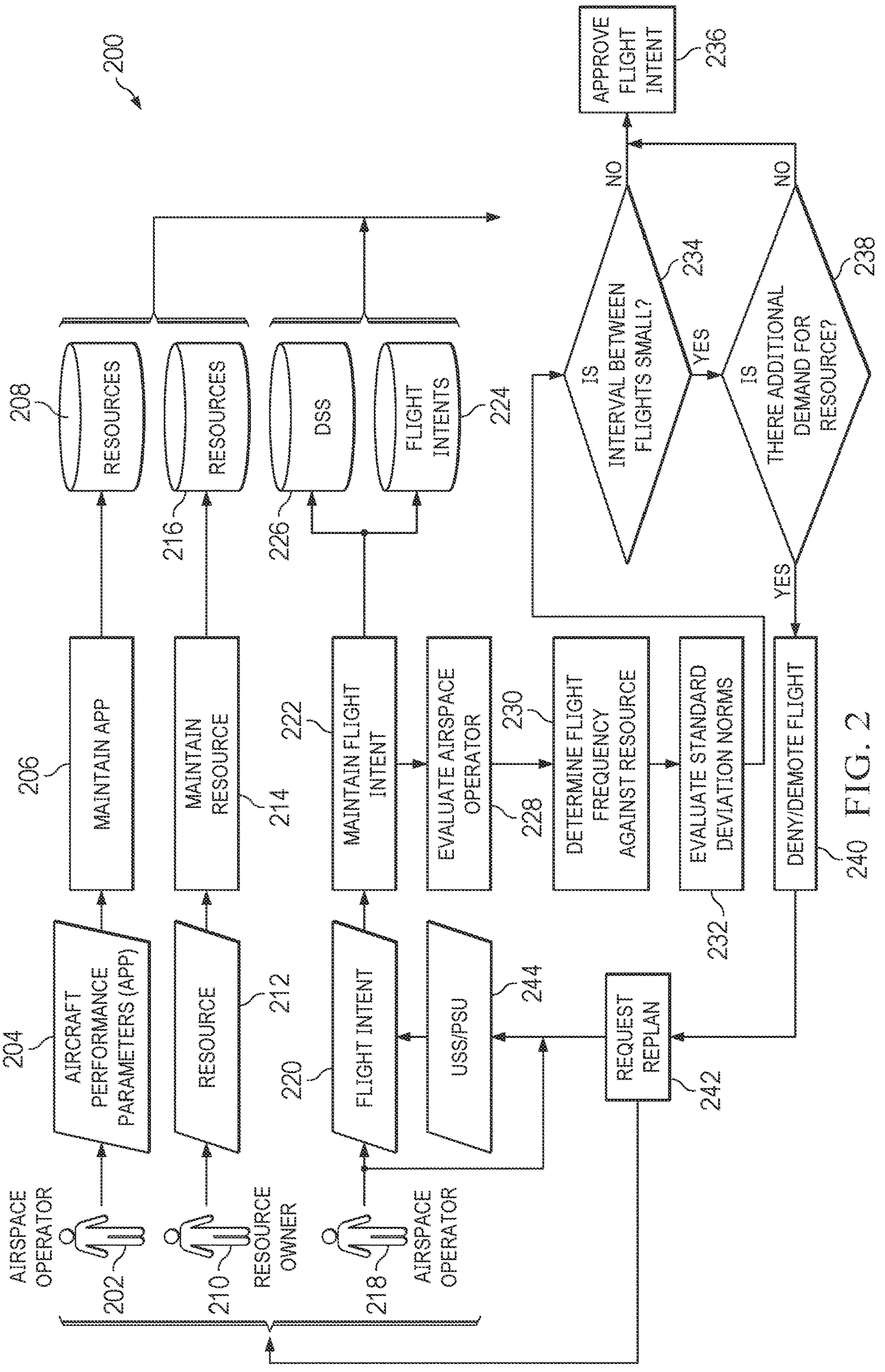
FIG. 2 illustrates an example functional architecture supporting equitable resource access through adjudication of flight plan requests or other requests according to this disclosure.

FIG. 2 illustrates an example functional architecture 200 supporting equitable resource access through adjudication of flight plan requests or other requests according to this disclosure. For ease of explanation, the functional architecture 200 is described as being performed or supported by the equitable resource allocation system 114. However, the functional architecture 200 may be implemented using any suitable device or system, and the functional architecture 200 may be used with any suitable airspace resources or other shared resources.

As shown in FIG. 2, one or more users 202 associated with each airspace operator may provide information 204 regarding the aircraft of the airspace operator. The aircraft identified here can represent the aircraft that may use airspace resources within a given airspace being managed using the functional architecture 200. For example, the users 202 may provide aircraft performance parameters (APP) associated with the aircraft, where the aircraft performance parameters define certain physical, operational, or other characteristics of the aircraft. Specific examples of aircraft performance parameters may include parameters defining how the aircraft can take off and land (such as horizontally or vertically) and the aircraft's associated runway allocations, how much separation from the aircraft needs to be maintained by other aircraft during flight, restrictions on the aircraft from taking off or landing (such as the amount of time a smaller aircraft needs to wait before taking off or landing at the same location where a larger aircraft has recently taken off or landed), or other information related to the physical, operational, or other characteristics of the aircraft. A maintenance function 206 can be used to persist the information 204 in a data store 208.

One or more users 210 associated with specified airspace resources or other resources may also provide information 212 regarding the resources. For example, the users 210 may provide information defining which portions of an associated airspace 100 are available for use by different types of aircraft and which portions of the associated airspace 100 are restricted from use by different types of aircraft. This type of information may be obtained from any suitable source(s), such as a governmental entity or other resource owner or manager. A maintenance function 214 can be used to persist the information 212 in a data store 216.

When each airspace operator would like to operate aircraft within a given airspace 100, one or more users 218

(who may or may not represent the same users 202) can submit flight intents 220 to the equitable resource allocation system 114. In some cases, the users 218 may submit the flight intents 220 directly to the equitable resource allocation system 114, such as by using one or more systems of the associated airspace operator to submit the flight intents 220 to the equitable resource allocation system 114. In other cases, the flight intents 220 may be generated by at least one separate system based on inputs from the users 218, such as when the users 218 can use one or more UAS service supplier (USS) or provider of services for urban air mobility (PSU) systems 244 to generate the flight intents 220. In whatever manner the flight intents 220 are generated, a maintenance function 222 can be used to persist the flight intents 220 in a data store 224. The flight intents 220 can also be provided to a discovery and synchronization service (DSS) 226, which generally operates to identify the airspace operators that are operating within one or more airspaces and to provide access to the flight intents 220 associated with those airspace operators. For instance, the discovery and synchronization service 226 may allow other functions of the functional architecture 200 to obtain and analyze the flight intents 220 for a given airspace in order to generate expected distributions of the flight intents 220 over time.

The flight intents 220 from the users 218, USS/PSU system(s) 244, or other source(s) are also provided to an evaluation function 228, which generally operates to analyze those flight intents 220 in order to identify one or more statistics or other information about those flight intents 220. For example, the evaluation function 228 may determine the average number of flight intents 220 submitted by a flight operator for each minute or other interval of time for a given resource in an airspace. This can be performed across all resources and for all airspace operators who use those resources. In this example, that information is used by a determination function 230, which generally operates to analyze the statistics or other information generated by the evaluation function 228 in order to determine a frequency of aircraft flights associated with the flight intents 220 submitted by each airspace operator for each resource in the airspace during each minute or other interval of time.

An evaluation function 232 generally operates to analyze the flight intents 220 from various airspace operators received over time in order to estimate what the distributions of the flight intents 220 are expected or desired to be for a given airspace or airspace resource. For example, the evaluation function 232 may analyze historical or current flight intents 220 as provided by the discovery and synchronization service 226 in order to identify an average number of aircraft flights flown by airspace operators for each of various airspace resources. This can be done for various times of day, such as by identifying average numbers of aircraft flights for each hour of the day (and possibly by identifying average numbers of aircraft flights for each hour of different days). This can also be performed for various types of aircraft, such as by identifying average numbers of aircraft flights for airplanes, helicopters, air taxis, and drones or other UASs (and this can itself be subdivided into airplanes, helicopters, air taxis, or UASs of different weights or other types). In addition, this can be performed for various airspace resources, such as by identifying average numbers of aircraft flights for different locations in which the aircraft take off and land (like airports or air taxi/drone/UAS hubs) and other locations within the given airspace 100. Overall, the evaluation function 232 can be used to generate any suitable distributions identifying average or other expected or desired flight intents 220 for the airspace operators over time. These distributions can form a baseline of what is considered "fair" or "equitable" flight intents.

The evaluation function 232 can also compare the determinations generated by the determination function 230 for current flight intents 220 to the expected distributions. For instance, the evaluation function 232 may determine whether each of the determined flight frequencies for the current flight intents 220 (as generated by the determination function 230) falls within one or more standard deviations of an average flight frequency for a given resource or airspace. Flight intents 220 having higher flight frequencies are generally associated with smaller intervals of time between flights, and a decision function 234 generally operates to determine whether any of the current flight intents 220 have a flight frequency that is too small. These flight intents 220 can be indicative of a greedy airspace operator who is attempting to monopolize an airspace resource (at least for some period of time). For example, the decision function 234 can determine whether any of the current flight intents 220 have an excessively small time interval, such as a time interval below a threshold. For flight intents 220 having a time interval that does not fall below the threshold, an approval function 236 can generally operate to approve those flight intents 220.

For flight intents 220 having a time interval that falls below the threshold, a decision function 238 generally operates to determine whether there is other demand for the associated airspace resource. For example, the decision function 238 may determine whether other airspace operators have requested use of the same airspace resource. If not, the excess flight intents 220 can still be approved by the approval function 236 since there are no competing operators who are requesting use of the same resource during the same time period (so there is no concern about inequitable resource access by approving the flight intents 220). Otherwise, a deny/demote function 240 generally operates to deny at least some of those flight intents 220 or to demote at least some those flight intents 220 (such as by moving those flight intents 220 to other date/time slots that might not have been requested by the associated greedy airspace operator). Optionally, a replanning function 242 can be invoked and can request that a user 218 or USS/PSU system 244 resubmit one or more flight intents 220 or accept/reject any demoted flight intents 220.

As can be seen here, the functional architecture 200 enables more equitable access to airspace resources by multiple airspace operators. Airspace operators are permitted to submit flight intents 220, and the distributions of those flight intents 220 over time can be compared to expected distributions of the flight intents 220 in order to identify greedy operators. If excessive flight intents 220 from an airspace operator are detected, it is possible to demote or deny those flight intents 220 when other airspace operators wish to have access to the same airspace resource(s). However, the flight intents 220 (even if excessive) may be approved if other airspace operators do not request access to the same airspace resource(s).

It should be noted that the functions shown in or described with respect to FIG. 2 can be implemented in any suitable device(s) and in any suitable manner. For example, in some embodiments, at least some of the functions shown in or described with respect to FIG. 2 can be implemented or supported using one or more software applications or other software instructions that are executed by one or more processors of an electronic device, such as a server or other computer. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions. Also, the functions shown in or described with respect to FIG. 2 can be performed by a single device or by multiple devices.

Although FIG. 2 illustrates an example functional architecture 200 supporting equitable resource access through adjudication of flight plan requests or other requests, various changes may be made to FIG. 2. For example, various components and functions in FIG. 2 may be combined, further subdivided, replicated, omitted, or rearranged and additional components and functions may be added according to particular needs. Also, while multiple data stores are shown here, the information contained in the data stores may be stored at a single location (such as in a single database) or across multiple locations (such as in multiple databases). Further, the types of information collected and used by the equitable resource allocation system 114 may vary from the types of information shown here. In addition, the equitable resource allocation system 114 may perform any other or additional analysis or analyses of the flight intents 220 in order to identify flight intents 220 that are outside of expected distributions.

Figure 3:
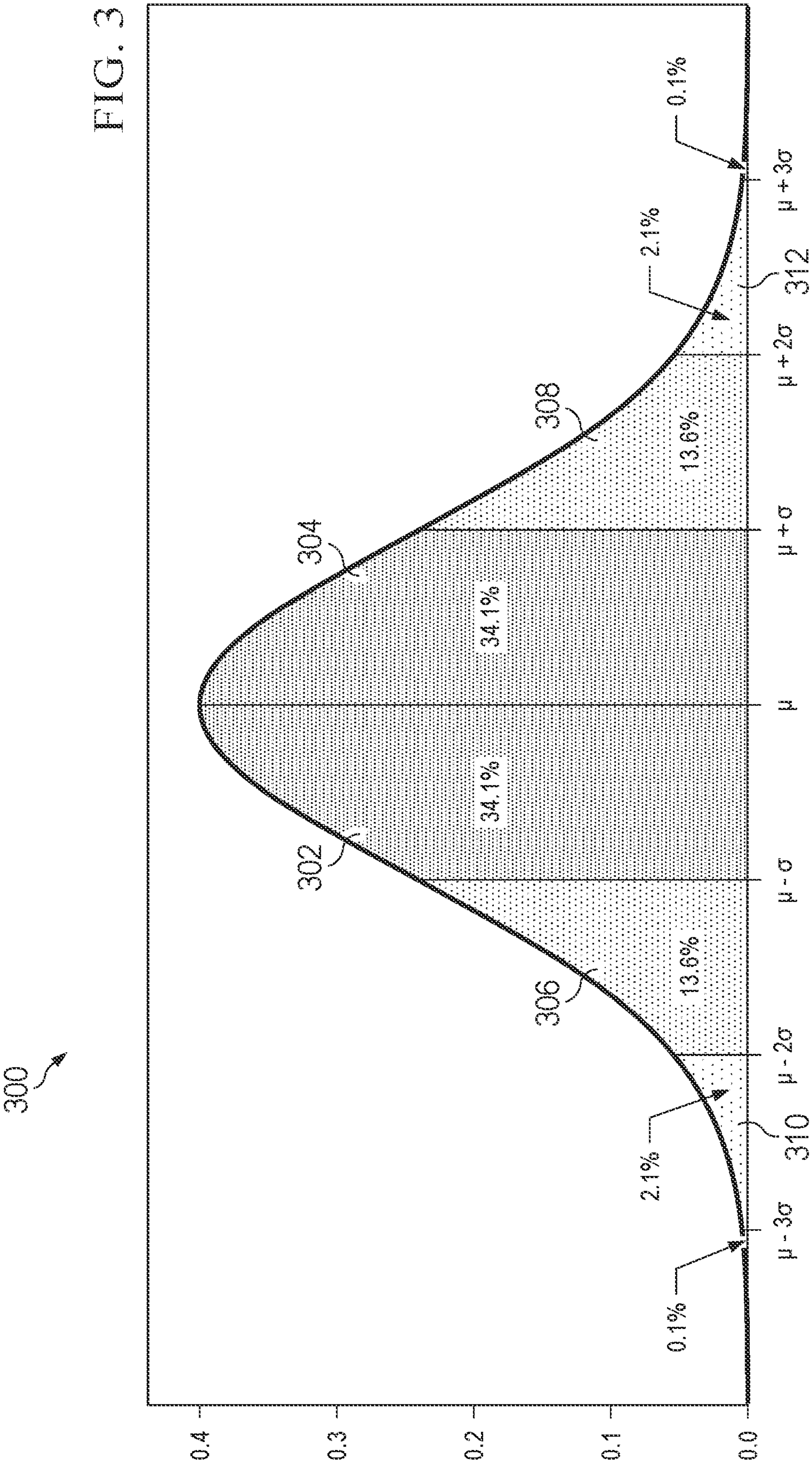
FIG. 3 illustrates an example distribution for identifying airspace operators requesting excessive airspace resources according to this disclosure.

FIG. 3 illustrates an example distribution 300 for identifying airspace operators requesting excessive airspace resources according to this disclosure. For example, the distribution 300 shown in FIG. 3 may represent one example of a distribution determined using the evaluation function 232 and used by the equitable resource allocation system 114 as a baseline in order to identify excessive flight intents 220 requesting airspace resources. Note, however, that the equitable resource allocation system 114 may generate and use any other suitable distributions.

As shown in FIG. 3, this example of the distribution 300 generally takes the form of a bell curve or normal distribution. In this particular example, the distribution 300 includes two sections 302 and 304 positioned on opposite sides of an average value of flight frequencies (denoted p). These two sections 302 and 304 may identify groups of flight frequencies falling within one standard deviation (denoted σ) of the average value. As a particular example, these two sections 302 and 304 may identify groups of flight frequencies that are approximately equal to two flights per minute. The distribution 300 also includes two sections 306 and 308 positioned on opposite sides of the sections 302 and 304. These two sections 306 and 308 may identify groups of flight frequencies falling outside one standard deviation but within two standard deviations of the average value. As a particular example, these two sections 306 and 308 may identify groups of flight frequencies that are approximately equal to three to five flights per minute. In addition, the distribution 300 includes two sections 310 and 312 positioned on opposite sides of the sections 306 and 308. These two sections 310 and 312 may identify groups of flight frequencies falling outside one and two standard deviations but within three standard deviations of the average value. As a particular example, these two sections 310 and 312 may identify groups of flight frequencies that are approximately equal to six or more flights per minute.

In some cases, the distribution 300 shown in FIG. 3 may be used as an expected distribution of flight intents and may be based on prior or current flight intents 220 received from airspace operators. When flight intents 220 are processed for approval or denial/demotion, the frequencies of those flight intents 220 can be compared to the distribution 300. If a frequency of certain flight intents 220 falls within one or more sections of the distribution 300, those flight intents 220 can be viewed as excessive and can be denied or demoted. As a particular example, flight intents 220 having frequencies within the sections 302-304 may be viewed as permissible and granted since those flight intents 220 are around the average. Flight intents 220 having frequencies within the sections 306 and 310 may also be viewed as permissible and granted since those flight intents 220 have a lower frequency and are unlikely to involve one operator monopolizing an airspace resource.

Flight intents 220 having frequencies within the section 308 and/or the section 312 may be viewed as problematic, and the equitable resource allocation system 114 can take one or more actions to ensure that the flight intents 220 having frequencies within the section(s) 308, 312 are handled appropriately to provide equitable use of the airspace resources. For example, the flight intents 220 having frequencies within the section 312 may be viewed as very excessive and may be denied outright, while the flight intents 220 having frequencies within the section 308 may be viewed as excessive and may be demoted (such as to later date/time slots). Of course, these actions relative to these sections of the distribution 300 are for illustration only, and flight intents 220 having higher frequencies may be handled in any other suitable manner.

Although FIG. 3 illustrates one example of a distribution 300 for identifying airspace operators requesting excessive airspace resources, various changes may be made to FIG. 3. For example, while the distribution 300 is described as being based on frequencies of flight intents 220, other measures (such as intervals of time between aircraft flights associated with the flight intents 220) may be used to form the distribution 300. Also, while the distribution 300 is shown here as having the shape of a normal distribution, the distribution 300 may have any other suitable symmetrical or asymmetrical form, which will depend (at least in part) on how the flight intents 220 are analyzed in order to form a baseline for what constitutes an expected or desired distribution of flight intents 220.

FIG. 4 illustrates an example graphical user interface 400 identifying results of equitable resource access through adjudication of flight plan requests or other requests according to this disclosure. For example, the graphical user interface 400 shown in FIG. 4 may be generated based on approval and denial/demotion decisions made by the equitable resource allocation system 114 based on flight intents 220 requesting access to airspace resources. Note, however, that the equitable resource allocation system 114 may generate any other suitable outputs, which may or may not be intended for display to one or more human users.

As shown in FIG. 4, the graphical user interface 400 includes a table that presents decisions made by the equitable resource allocation system 114. In this example, the table includes different entries 402 associated with different flight intents 220 and their related decisions by the equitable resource allocation system 114. In this particular example, each entry 402 is associated with one of the flight intents 220 and includes a resource identifier (ID) identifying a specific airspace resource associated with the flight intent 220 and a sequence number identifying a number of the flight intent 220 within a series of flight intents 220 associated with the specific airspace resource. Each entry 402 also includes a request identifier (such as a callsign) identifying a specific aircraft associated with the flight intent 220 and an airspace operator associated with the aircraft. Each entry 402 further includes an identification of the determined equitable status associated with the flight intent 220 and an action associated with the flight intent 220. In addition, each entry 402 includes a requested time associated with the flight intent 220, a requested duration associated with the flight intent 220, and an estimated time to be assigned to the flight intent 220.

In this example, the determined equitable status associated with each flight intent 220 is expressed as an indication of whether the flight intent 220 falls with one, two, or three standard deviations of the associated distribution 300. Of course, the determined equitable status may be expressed using other notations or explanations. Each equitable status may also have a suitable color or other indicator 404 identifying the equitable status. For instance, each equitable status may have a green background or other indicator 404 when the equitable status indicates that the associated flight intent 220 falls within one standard deviation in the associated distribution 300. Each equitable status may have a yellow background or other indicator 404 when the equitable status indicates that the associated flight intent 220 falls within two standard deviations (but outside one standard deviation) in the associated distribution 300. Each equitable status may have a red background or other indicator 404 when the equitable status indicates that the associated flight intent 220 falls within three standard deviations (but outside two standard deviations) in the associated distribution 300. Note, however, that these colors are for illustration only, and any other or additional indicators 404 may be used.

The actions associated with the flight intents 220 here generally correspond to the determined equitable statuses. For example, flight intents 220 that fall within one standard deviation in the associated distribution 300 may be approved, flight intents 220 that fall within two standard deviations (but outside one standard deviation) in the associated distribution 300 may be demoted, and flight intents 220 that fall within three standard deviations (but outside two standard deviations) in the associated distribution 300 may be denied. Note, however, that other actions may be associated with the same equitable statuses or with different collections of equitable statuses.

In some embodiments, the graphical user interface 400 may be used by one or more users to obtain situational awareness regarding requests for one or more resources. For example, the graphical user interface 400 may be used by various users 218 associated with airspace operators who are submitting the flight intents 220. Also, in some embodiments, the graphical user interface 400 may include an option allowing one or more users to resubmit a rejected flight intent 220 with a different date/time slot selected (when the user is associated with an airspace operator) or to override any autonomous actions (when the user is associated with a resource manager).

Although FIG. 4 illustrates one example of a graphical user interface 400 identifying results of equitable resource access through adjudication of flight plan requests or other requests, various changes may be made to FIG. 4. For example, the contents, layout, and arrangement of the graphical user interface 400 may easily vary from those shown here. Graphical user interfaces can come in a wide variety of configurations, and FIG. 4 does not limit this disclosure to any particular graphical user interface.

Figure 5:
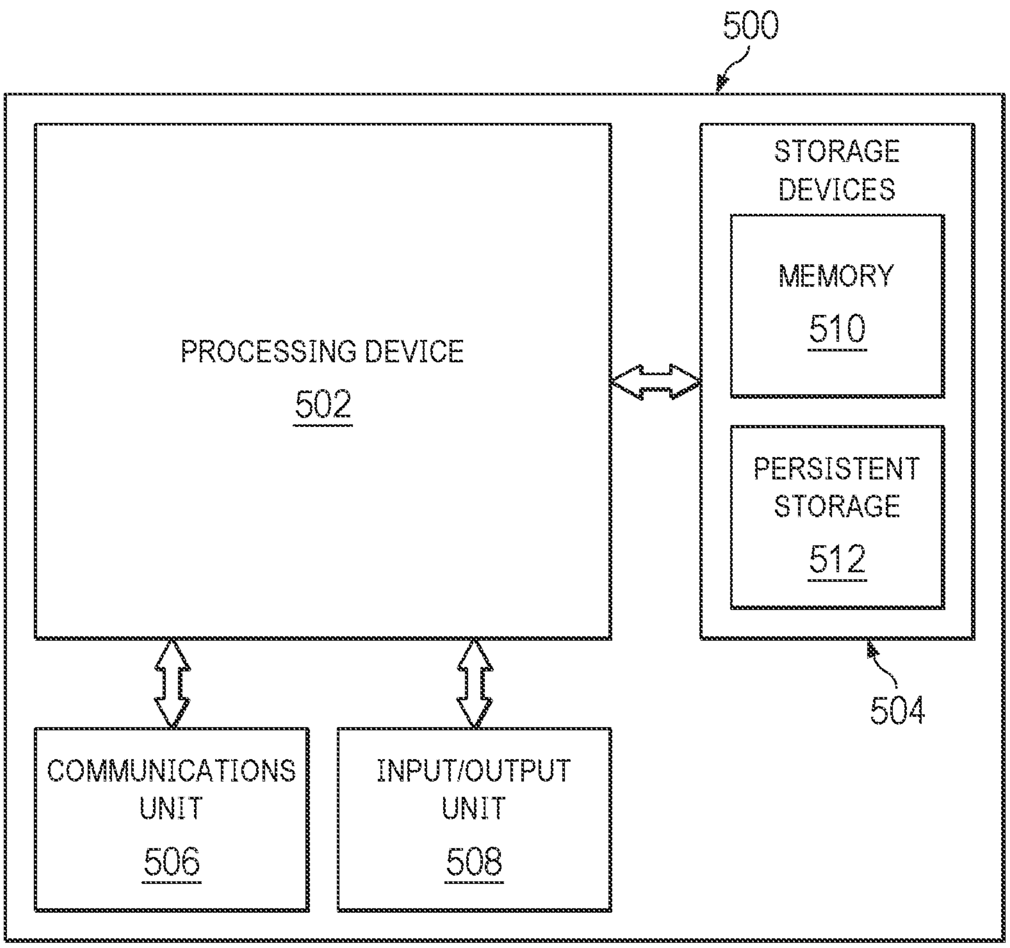
FIG. 5 illustrates an example device supporting equitable resource access through adjudication of flight plan requests or other requests according to this disclosure.

FIG. 5 illustrates an example device 500 supporting equitable resource access through adjudication of flight plan requests or other requests according to this disclosure. One or more instances of the device 500 may, for example, be used to at least partially implement the functionality of the equitable resource allocation system 114 shown in FIG. 1, such as when the device or devices 500 are used to perform or support various functions of the functional architecture 200 shown in FIG. 2. However, the various functionalities of the equitable resource allocation system 114 and the functional architecture 200 may be implemented in any other suitable manner.

As shown in FIG. 5, the device 500 denotes a computing device or system that includes at least one processing device 502, at least one storage device 504, at least one communications unit 506, and at least one input/output (I/O) unit 508. The processing device 502 may execute instructions that can be loaded into a memory 510. The processing device 502 includes any suitable number(s) and type(s) of processors or other processing devices in any suitable arrangement. Example types of processing devices 502 include one or more microprocessors, microcontrollers, digital signal processors (DSPs), application specific integrated circuits (ASICs), field programmable gate arrays (FPGAs), or discrete circuitry.

The memory 510 and a persistent storage 512 are examples of storage devices 504, which represent any structure(s) capable of storing and facilitating retrieval of information (such as data, program code, and/or other suitable information on a temporary or permanent basis). The memory 510 may represent a random access memory or any other suitable volatile or non-volatile storage device(s). The persistent storage 512 may contain one or more components or devices supporting longer-term storage of data, such as a read only memory, hard drive, Flash memory, or optical disc.

The communications unit 506 supports communications with other systems or devices. For example, the communications unit 506 can include a network interface card or a wireless transceiver facilitating communications over a wired or wireless network. The communications unit 506 may support communications through any suitable physical or wireless communication link(s).

The I/O unit 508 allows for input and output of data. For example, the I/O unit 508 may provide a connection for user input through a keyboard, mouse, keypad, touchscreen, or other suitable input device. The I/O unit 508 may also send output to a display, printer, or other suitable output device. Note, however, that the I/O unit 508 may be omitted if the device 500 does not require local I/O, such as when the device 500 represents a server or other device that can be accessed remotely.

In some embodiments, the instructions executed by the processing device 502 include instructions that implement the various functionalities of the equitable resource allocation system 114 and the functional architecture 200. Thus, for example, the instructions when executed may cause the processing device 502 to analyze flight intents 220, identify expected distributions of flight intents 220, identify excessive flight intents 220 from greedy airspace operators based on the expected distributions, and arbitrate across flight intents 220 by approving, denying, or changing the flight intents 220.

Although FIG. 5 illustrates one example of a device 500 supporting equitable resource access through adjudication of flight plan requests or other requests, various changes may be made to FIG. 5. For example, computing and communication devices and systems come in a wide variety of configurations, and FIG. 5 does not limit this disclosure to any particular computing or communication device or system.

Figure 6:
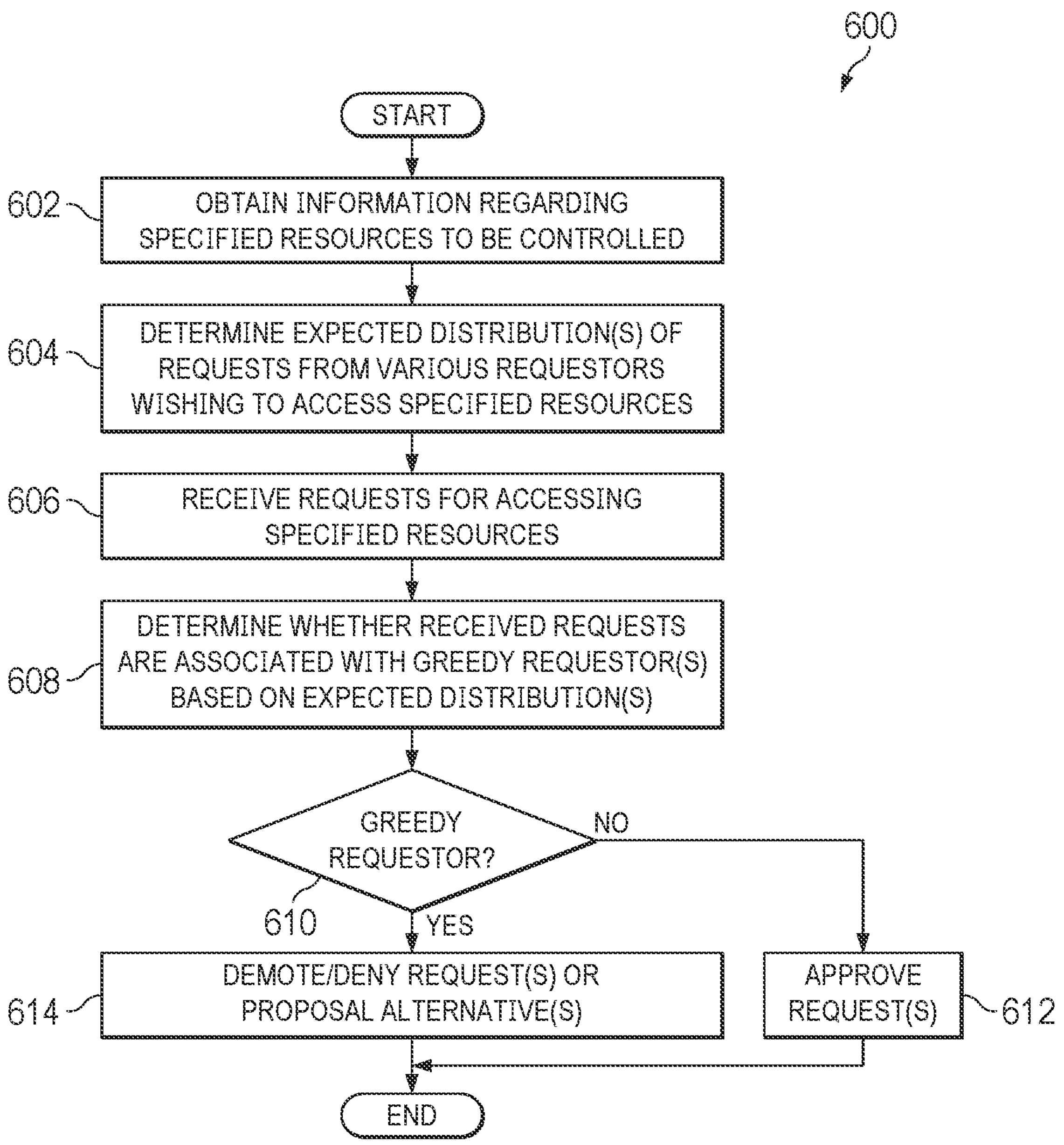
FIG. 6 illustrates an example method for equitable resource access through adjudication of flight plan requests or other requests according to this disclosure.

FIG. 6 illustrates an example method 600 for equitable resource access through adjudication of flight plan requests or other requests according to this disclosure. For ease of explanation, the method 600 shown in FIG. 6 may be described as being performed using the equitable resource allocation system 114 shown in FIG. 1, where the equitable resource allocation system 114 may implement the functional architecture 200 shown in FIG. 2 and be implemented using one or more devices 500 shown in FIG. 5. However, the method 600 may be performed using any other suitable device(s) and architecture(s) and in any other suitable system(s).

As shown in FIG. 6, information regarding specific resources to be controlled (at least with respect to access) is obtained at step 602. This may include, for example, one or more processing devices 502 of the equitable resource allocation system 114 obtaining information regarding airspace resources that are available for use and aircraft that may use the airspace resources. This may also include one or more processing devices 502 of the equitable resource allocation system 114 obtaining historical or current flight intents 220 associated with usage of the airspace resources. At least one expected distribution of requests from various requestors wishing to access the resources is determined at step 604. This may include, for example, one or more processing devices 502 of the equitable resource allocation system 114 analyzing the historical or current flight intents 220 (possibly by airspace operator, resource, and time) in order to identify one or more distributions 300 associated with the usage of the airspace resources. Each distribution 300 can identify a distribution of at least one characteristic of the flight intents 220, where the distribution includes expected or desired values of the characteristic(s).

Requests for accessing the specified resources are received a step 606. This may include, for example, one or more processing devices 502 of the equitable resource allocation system 114 receiving flight intents 220 for upcoming aircraft flights of one or more airspace operators. A determination is made whether any of the flight intents is associated with at least one greedy airspace operator at step 608. This may include, for example, one or more processing devices 502 of the equitable resource allocation system 114 comparing a frequency or other characteristic(s) of the flight intents 220 with the frequencies or other characteristic(s) contained in one or more expected distributions 300. If a determination is made that flight intents are not associated with a greedy requestor (or that flight intents are associated with a greedy requestor but there are no competing requests for the same resource), the flight intents are approved at step 612. This may include, for example, one or more processing devices 502 of the equitable resource allocation system 114 granting access to one or more of the specified airspace resources in accordance with the approved flight intents 220. Otherwise, flight intents are denied or demoted at step 614. This may include, for example, one or more processing devices 502 of the equitable resource allocation system 114 denying access to one or more of the specified airspace resources or granting access to one or more of the specified airspace resources but during one or more different date/time slots than requested.

Although FIG. 6 illustrates one example of a method 600 for equitable resource access through adjudication of flight plan requests or other requests, various changes may be made to FIG. 6. For example, while shown as a series of steps, various steps in FIG. 6 may overlap, occur in parallel, occur in a different order, or occur any number of times. Also, the method 600 may be performed to provide equitable resource access for any other suitable resources based on any suitable access requests and is not limited to controlling access to airspace resources through adjudication of flight plan requests having the form of flight intents.

The following describes example embodiments of this disclosure that implement or relate to equitable resource access through adjudication of flight plan requests or other requests. However, other embodiments may be used in accordance with the teachings of this disclosure.

In a first embodiment, a method includes obtaining information associated with requests to access at least one shared resource, where the requests are associated with multiple requestors wishing to access or use the at least one shared resource. The method also includes generating at least one expected distribution of requests, where the at least one expected distribution of requests defines one or more expected or desired characteristics of the requests to access or use the at least one shared resource. The method further includes granting one or more first ones of the requests to access or use the at least one shared resource in response to determining that the one or more first ones of the requests have the one or more expected or desired characteristics. In addition, the method includes denying or demoting one or more second ones of the requests to access or use the at least one shared resource in response to determining that the one or more second ones of the requests do not have the one or more expected or desired characteristics.

In a second embodiment, an apparatus includes at least one processing device configured to obtain information associated with requests to access at least one shared resource, where the requests are associated with multiple requestors wishing to access or use the at least one shared resource. The at least one processing device is also configured to generate at least one expected distribution of requests, where the at least one expected distribution of requests defines one or more expected or desired characteristics of the requests to access or use the at least one shared resource. The at least one processing device is further configured to grant one or more first ones of the requests to access or use the at least one shared resource in response to determining that the one or more first ones of the requests have the one or more expected or desired characteristics. In addition, the at least one processing device is configured to deny or demote one or more second ones of the requests to access or use the at least one shared resource in response to determining that the one or more second ones of the requests do not have the one or more expected or desired characteristics.

In a third embodiment, a non-transitory computer readable medium stores instructions that when executed cause at least one processor to obtain information associated with requests to access at least one shared resource, where the requests are associated with multiple requestors wishing to access or use the at least one shared resource. The non-transitory computer readable medium also stores instructions that when executed cause the at least one processor to generate at least one expected distribution of requests, where the at least one expected distribution of requests defines one or more expected or desired characteristics of the requests to access or use the at least one shared resource. The non-transitory computer readable medium further stores instructions that when executed cause the at least one processor to grant one or more first ones of the requests to access or use the at least one shared resource in response to determining that the one or more first ones of the requests have the one or more expected or desired characteristics. In addition, the non-transitory computer readable medium stores instructions that when executed cause the at least one processor to deny or demote one or more second ones of the requests to access or use the at least one shared resource in response to determining that the one or more second ones of the requests do not have the one or more expected or desired characteristics.

Any single one or any suitable combination of the following features may be used with the first, second, or third embodiment. It may be determined that (i) the one or more first ones of the requests have one or more characteristics falling within one or more first groups of characteristic values associated with the one or more expected or desired characteristics and (ii) the one or more second ones of the requests have one or more characteristics falling within one or more second groups of characteristic values not associated with the one or more expected or desired characteristics. The one or more first groups of characteristic values may include (i) two groups of characteristic values within one standard deviation of an average characteristic value and (ii) one or more groups of characteristic values less than the average characteristic value, and the one or more second groups of characteristic values may include one or more groups of characteristic values greater than one standard deviation above the average characteristic value. The one or more second groups of characteristic values may include (i) a first group of characteristic values within two standard deviations but outside one standard deviation of an average characteristic value and greater than the average characteristic value (any of the one or more second ones of the requests within the first group of characteristic values being demoted) and (ii) a second group of characteristic values within three standard deviations but outside two standard deviations of the average characteristic value and greater than the average characteristic value (any of the one or more second ones of the requests within the second group of characteristic values being denied). The at least one shared resource may include one or more airspace resources, and the requests to access the at least one shared resource may include flight intents associated with airspace operators wishing to fly aircraft through at least one airspace. First ones of the flight intents may be granted so that the airspace operators are permitted to fly associated aircraft through the at least one airspace, second ones of the flight intents may be denied so that the airspace operators are not permitted to fly associated aircraft through the at least one airspace, and third ones of the flight intents may be demoted so that the airspace operators are permitted to fly associated aircraft through the at least one airspace but during different date or time slots. The granting and the denying or demoting of the requests to access or use the at least one shared resource may provide for equitable access by different ones of the airspace operators to the at least one airspace. The one or more expected or desired characteristics may include flight frequencies or flight intervals associated with the aircraft.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

obtaining information associated with requests to access at least one shared resource, the requests associated with multiple requestors wishing to access or use the at least one shared resource;

generating at least one expected distribution of requests, the at least one expected distribution of requests defining one or more expected or desired characteristics of the requests to access or use the at least one shared resource;

determining that one or more first ones of the requests have one or more characteristics falling within one or more groups of characteristic values not associated with the one or more expected or desired characteristics, wherein the one or more groups of characteristic values comprise:

a first group of characteristic values within two standard deviations but outside one standard deviation of an average characteristic value and greater than the average characteristic value, any of the one or more first ones of the requests within the first group of characteristic values being autonomously demoted; and a second group of characteristic values within three standard deviations but outside two standard deviations of the average characteristic value and greater than the average characteristic value, any of the one or more first ones of the requests within the second group of characteristic values being autonomously denied; and granting one or more second ones of the requests to access or use the at least one shared resource in response to determining that the one or more second ones of the requests have the one or more expected or desired characteristics.

2. The method of claim 1, further comprising:

determining that the one or more second ones of the requests have one or more characteristics falling within one or more additional groups of characteristic values associated with the one or more expected or desired characteristics.

3. The method of claim 2, wherein:

the one or more additional groups of characteristic values comprise (i) two groups of characteristic values within one standard deviation of the average characteristic value and (ii) one or more groups of characteristic values less than the average characteristic value; and the one or more groups of characteristic values comprise characteristic values greater than one standard deviation above the average characteristic value.

4. The method of claim 1, wherein:

the at least one shared resource comprises one or more airspace resources; and the requests to access the at least one shared resource comprise flight intents associated with airspace operators wishing to fly aircraft through at least one airspace.

5. The method of claim 4, wherein:

granting the one or more second ones of the requests comprises granting first ones of the flight intents so that the airspace operators are permitted to fly associated aircraft through the at least one airspace; and denying or demoting the one or more first ones of the requests comprises:

denying second ones of the flight intents so that the airspace operators are not permitted to fly associated aircraft through the at least one airspace; and demoting third ones of the flight intents so that the airspace operators are permitted to fly associated aircraft through the at least one airspace but during different date or time slots.

6. The method of claim 5, wherein the granting and the denying or demoting of the requests to access or use the at least one shared resource provide for access by different ones of the airspace operators to the at least one airspace according to the at least one expected distribution of requests for access to the at least one airspace by the different ones of the airspace operators.

7. The method of claim 4, wherein the one or more expected or desired characteristics comprise flight frequencies or flight intervals associated with the aircraft.

8. An apparatus comprising:

at least one processing device configured to:

obtain information associated with requests to access at least one shared resource, the requests associated with multiple requestors wishing to access or use the at least one shared resource;

generate at least one expected distribution of requests, the at least one expected distribution of requests defining one or more expected or desired characteristics of the requests to access or use the at least one shared resource;

determine that one or more first ones of the requests have one or more characteristics falling within one or more groups of characteristic values not associated with the one or more expected or desired characteristics, wherein the one or more groups of characteristic values comprise:

a first group of characteristic values within two standard deviations but outside one standard deviation of an average characteristic value and greater than the average characteristic value, any of the one or more first ones of the requests within the first group of characteristic values being autonomously demoted; and a second group of characteristic values within three standard deviations but outside two standard deviations of the average characteristic value and greater than the average characteristic value, any of the one or more first ones of the requests within the second group of characteristic values being autonomously denied; and grant one or more second ones of the requests to access or use the at least one shared resource in response to determining that the one or more second ones of the requests have the one or more expected or desired characteristics.

9. The apparatus of claim 8, wherein the at least one processing device is further configured to:

determine that the one or more second ones of the requests have one or more characteristics falling within one or more additional groups of characteristic values associated with the one or more expected or desired characteristics.

10. The apparatus of claim 9, wherein:

the one or more additional groups of characteristic values comprise (i) two groups of characteristic values within one standard deviation of the average characteristic value and (ii) one or more groups of characteristic values less than the average characteristic value; and the one or more groups of characteristic values comprise characteristic values greater than one standard deviation above the average characteristic value.

11. The apparatus of claim 8, wherein:

the at least one shared resource comprises one or more airspace resources; and the requests to access the at least one shared resource comprise flight intents associated with airspace operators wishing to fly aircraft through at least one airspace.

12. The apparatus of claim 11, wherein the at least one processing device is configured to:

grant first ones of the flight intents so that the airspace operators are permitted to fly associated aircraft through the at least one airspace;

deny second ones of the flight intents so that the airspace operators are not permitted to fly associated aircraft through the at least one airspace; and demote third ones of the flight intents so that the airspace operators are permitted to fly associated aircraft through the at least one airspace but during different date or time slots.

13. The apparatus of claim 12, wherein the at least one processing device is configured to grant and deny or demote the requests to access or use the at least one shared resource in order to provide for access by different ones of the airspace operators to the at least one airspace according to the at least one expected distribution of requests for access to the at least one airspace by the different ones of the airspace operators.

14. The apparatus of claim 11, wherein the one or more expected or desired characteristics comprise flight frequencies or flight intervals associated with the aircraft.

15. A non-transitory computer readable medium storing instructions that when executed cause at least one processor to:

obtain information associated with requests to access at least one shared resource, the requests associated with multiple requestors wishing to access or use the at least one shared resource;

generate at least one expected distribution of requests, the at least one expected distribution of requests defining one or more expected or desired characteristics of the requests to access or use the at least one shared resource;

determine that one or more first ones of the requests have one or more characteristics falling within one or more groups of characteristic values not associated with the one or more expected or desired characteristics, wherein the one or more groups of characteristic values comprise:

a first group of characteristic values within two standard deviations but outside one standard deviation of an average characteristic value and greater than the average characteristic value, any of the one or more first ones of the requests within the first group of characteristic values being autonomously demoted; and a second group of characteristic values within three standard deviations but outside two standard deviations of the average characteristic value and greater than the average characteristic value, any of the one or more first ones of the requests within the second group of characteristic values being autonomously denied; and grant one or more second ones of the requests to access or use the at least one shared resource in response to determining that the one or more second ones of the requests have the one or more expected or desired characteristics.

16. The non-transitory computer readable medium of claim 15, further storing instructions that when executed cause the at least one processor to:

determine that the one or more second ones of the requests have one or more characteristics falling within one or more additional groups of characteristic values associated with the one or more expected or desired characteristics.

17. The non-transitory computer readable medium of claim 16, wherein:

the one or more additional groups of characteristic values comprise (i) two groups of characteristic values within one standard deviation of the average characteristic value and (ii) one or more groups of characteristic values less than the average characteristic value; and the one or more groups of characteristic values comprise characteristic values greater than one standard deviation above the average characteristic value.

18. The non-transitory computer readable medium of claim 15, wherein:

the at least one shared resource comprises one or more airspace resources;

the requests to access the at least one shared resource comprise flight intents associated with airspace operators wishing to fly aircraft through at least one airspace; and the instructions when executed cause the at least one processor, in order to provide for equitable access by different ones of the airspace operators to the at least one airspace, to:

grant first ones of the flight intents so that the airspace operators are permitted to fly associated aircraft through the at least one airspace;

deny second ones of the flight intents so that the airspace operators are not permitted to fly associated aircraft through the at least one airspace; and demote third ones of the flight intents so that the airspace operators are permitted to fly associated aircraft through the at least one airspace but during different date or time slots.

19. The non-transitory computer readable medium of claim 18, wherein the instructions when executed cause the at least one processor to grant and deny or demote the requests to access or use the at least one shared resource in order to provide for access by different ones of the airspace operators to the at least one airspace according to the at least one expected distribution of requests for access to the at least one airspace by the different ones of the airspace operators.

20. The non-transitory computer readable medium of claim 18, wherein the one or more expected or desired characteristics comprise flight frequencies or flight intervals associated with the aircraft.

* * * * *